US009759342B2

(12) United States Patent
Gota et al.

(10) Patent No.: US 9,759,342 B2
(45) Date of Patent: Sep. 12, 2017

(54) SLAM SHUT RESET PIN GUIDE ASSEMBLY AND SLAM SHUT SAFETY DEVICE COMPRISING SAME

(71) Applicant: EMERSON PROCESS MANAGEMENT REGULATOR TECHNOLOGIES, INC., McKinney, TX (US)

(72) Inventors: Eva Gota, Cluj-Napoca (RO); Tiberiu Moldovan, Cluj-Napoca (RO); Tung K. Nguyen, McKinney, TX (US)

(73) Assignee: EMERSON PROCESS MANAGEMENT REGULATOR TECHNOLOGIES, INC., McKinney, TX (US)

( * ) Notice: Subject to any disclaimer, the term of this patent is extended or adjusted under 35 U.S.C. 154(b) by 16 days.

(21) Appl. No.: 14/920,239

(22) Filed: Oct. 22, 2015

(65) Prior Publication Data

US 2016/0123487 A1    May 5, 2016

Related U.S. Application Data

(60) Provisional application No. 62/073,779, filed on Oct. 31, 2014.

(51) Int. Cl.
*F16K 17/00* (2006.01)
*F16K 17/18* (2006.01)
(Continued)

(52) U.S. Cl.
CPC .............. *F16K 17/18* (2013.01); *F16K 1/36* (2013.01); *F16K 1/422* (2013.01); *F16K 17/32* (2013.01); *G05D 16/10* (2013.01)

(58) Field of Classification Search
CPC ........ F16K 17/18; F16K 17/1732; F16K 1/36; F16K 1/422; G05D 16/10
(Continued)

(56) References Cited

U.S. PATENT DOCUMENTS 2,912,997 A * 11/1959 Griswold .............. F16K 31/365
137/456
3,762,685 A * 10/1973 Curran ................... F16K 27/02
137/454.6

(Continued)

FOREIGN PATENT DOCUMENTS

FR      1113829 A    4/1956

OTHER PUBLICATIONS

International Search Report for International application No. PCT/US2015/058185, mailed Jan. 28, 2016.
(Continued)

*Primary Examiner* — Umashankar Venkatesan
(74) *Attorney, Agent, or Firm* — Marshall, Gerstein & Borun LLP

(57) ABSTRACT

A slam shut safety device includes a valve body, a valve disc, a reset pin, and a reset pin guide. The valve disc is disposed within the valve body and shiftable along a slam shut axis between an open position and a closed second position. The reset pin is operatively coupled to the valve disc and shiftable along the slam shut axis relative to the valve body between an untripped position placing the valve disc in the open position and a tripped position placing the valve disc in the closed position. The reset pin guide supports one end of the reset pin, thereby providing added structural integrity to the reset pin and valve disc.

16 Claims, 4 Drawing Sheets

(51) Int. Cl.
*G05D 16/10* (2006.01)
*F16K 1/42* (2006.01)
*F16K 1/36* (2006.01)
*F16K 17/32* (2006.01)

(58) Field of Classification Search
USPC .......................................................... 137/456
See application file for complete search history.

(56) References Cited

U.S. PATENT DOCUMENTS

| | | |
|---|---|---|
| 8,225,812 B2 | 7/2012 | Faillat et al. |
| 2002/0134961 A1 | 9/2002 | Antoff et al. |
| 2012/0261604 A1* | 10/2012 | Woollums ............... F16K 17/32 |
| | | 251/337 |

OTHER PUBLICATIONS

Written Opinion for International application No. PCT/US2015/058185, mailed Jan. 28, 2016.
International Preliminary Report on Patentability for International application No. PCT/US2015/058185, dated May 2, 2017.

* cited by examiner

SLAM SHUT RESET PIN GUIDE ASSEMBLY AND SLAM SHUT SAFETY DEVICE COMPRISING SAME

FIELD OF THE DISCLOSURE

The present disclosure generally relates to slam shut safety devices and, more particularly, to slam-shut safety devices having reset pin guide assemblies.

BACKGROUND

Gas distribution systems, such as systems used to distribute natural gas, typically transport gas from a producer to a consumer along a series of pipes and through a series of valves. Each gas distribution system may include one or more regulator valves that control the pressure of the gas within the distribution system. Normally, the gas is transmitted at a high pressure through the system. However, the pressure of the gas must be reduced prior to final distribution to the consumers. This pressure reduction is typically accomplished at pressure reducing stations within local networks.

Typically, these pressure reducing stations include one or more pressure regulating valves and some sort of safety device to shut off the flow of gas should the pressure regulating valve fail. Most commonly, slam-shut safety valves are used for this purpose. For example, U.S. Pat. No. 4,134,421, which is hereby incorporated by reference, discloses a slam-shut safety valve that provides overpressure protection in a pipeline. Another example of a slam-shut safety valve is disclosed in U.S. Pat. No. 8,225,812, which also is incorporated by reference herein. The slam-shut safety valve is generally disposed upstream of the pressure regulating valve so that the slam-shut valve may prevent gas from reaching the pressure regulating valve in the event of the pressure regulating valve has failed. The slam-shut safety valve monitors gas pressure downstream of the pressure regulating valve for maximum and minimum pressure tolerances. If the downstream pressure exceeds either the maximum or minimum tolerance, the slam-shut safety valve closes, cutting off the flow of gas to the pressure regulating valve and preventing an uncontrolled leak of gas due to the pressure regulating valve failure.

Known slam-shut safety valves have a valve disc that covers a valve orifice in the vicinity of a valve seat when an overpressure or underpressure condition is sensed. The valve disc is coupled to a reset pin, and the reset pin in turn is attached to an actuator that senses the overpressure or underpressure condition. The reset pin is typically in the open or untripped position, which places the valve disc away from the valve seat in an open position. Should the actuator sense the appropriate trip condition, the actuator releases the reset pin, and the valve disc shifts to the closed position against the valve seat.

In conventional slam-shut devices, the reset pin is exposed to the flow of fluid. Moreover, in certain flow conditions, such as relatively high flow conditions, forces generated by the fluid flow can impact the proper operation of the reset pin, as well as even deform (e.g., bend) the reset pin or otherwise cause alignment problems between the valve disc and the valve seat.

SUMMARY

One aspect of the present disclosure includes a slam-shut safety device having a valve body, a valve disc, a rest pin, and a reset pin guide. The valve body has an inlet, an outlet, and defines a flow path extending between the inlet and the outlet. The valve body also includes a slam shut valve seat surrounding an orifice disposed between the inlet and the outlet. The valve disc is disposed within the valve body and shiftable along a slam shut axis between an open first position in which the valve disc is spaced away from the slam shut valve seat, and a closed second position in which the valve disc is seated against the slam shut valve seat. The reset pin is operatively coupled to the valve disc and shiftable along the slam shut axis relative to the valve body between an untripped position placing the valve disc in the open first position and a tripped position placing the valve disc in the closed second position. The reset pin is arranged to respond to an actuator to shift the reset pin from the untripped position toward the tripped position. A reset pin guide is disposed adjacent to the slam shut valve seat. The reset pin guide includes a central opening sized and shaped to receive a portion of the reset pin. The reset pin guide supports the reset pin, thereby structurally strengthening the reset pin during actuation of the valve disc.

Another aspect of the present disclosure includes a reset pin guide assembly for a slam shut safety device. The reset pin guide assembly includes a slam shut valve seat; a reset pin; a valve disc operatively connected to the reset pin, the reset pin and the valve disc being movable between a first position in which the valve disc is spaced apart from the slam shut valve seat and a second position in which the valve disc is adjacent the slam shut valve seat; and a reset pin guide disposed adjacent to the slam shut valve seat, the reset pin guide supporting one end of the reset pin.

Any of the above aspects of the disclosure may include any one or more of the following preferred forms.

In one preferred form, a valve seat cap secures the slam shut valve seat in the valve body. In another preferred form, the reset pin guide is disposed between the valve seat cap and the slam shut valve seat. In yet another preferred form, the reset pin guide is integral with the slam shut valve seat. In yet another preferred form, the reset pin guide includes a central opening that is sized and shaped to receive a portion of the reset pin. In yet another preferred form, the reset pin guide includes an outer annular ring. In yet another preferred form, the reset pin guide includes an inner annular ring that forms a central opening. In yet another preferred form, the reset pin guide includes a plurality of spokes connecting the outer annular ring and the inner annular ring. In yet another preferred form, the reset pin guide is formed to characterize fluid flow.

Additional optional aspects, arrangements, and features are disclosed, which may be arranged in any functionally appropriate manner, either alone or in any functionally viable combination, consistent with the teachings of the disclosure. Other aspects and advantages will become apparent upon consideration of the following detailed description.

DETAILED DESCRIPTION

Figure 1:
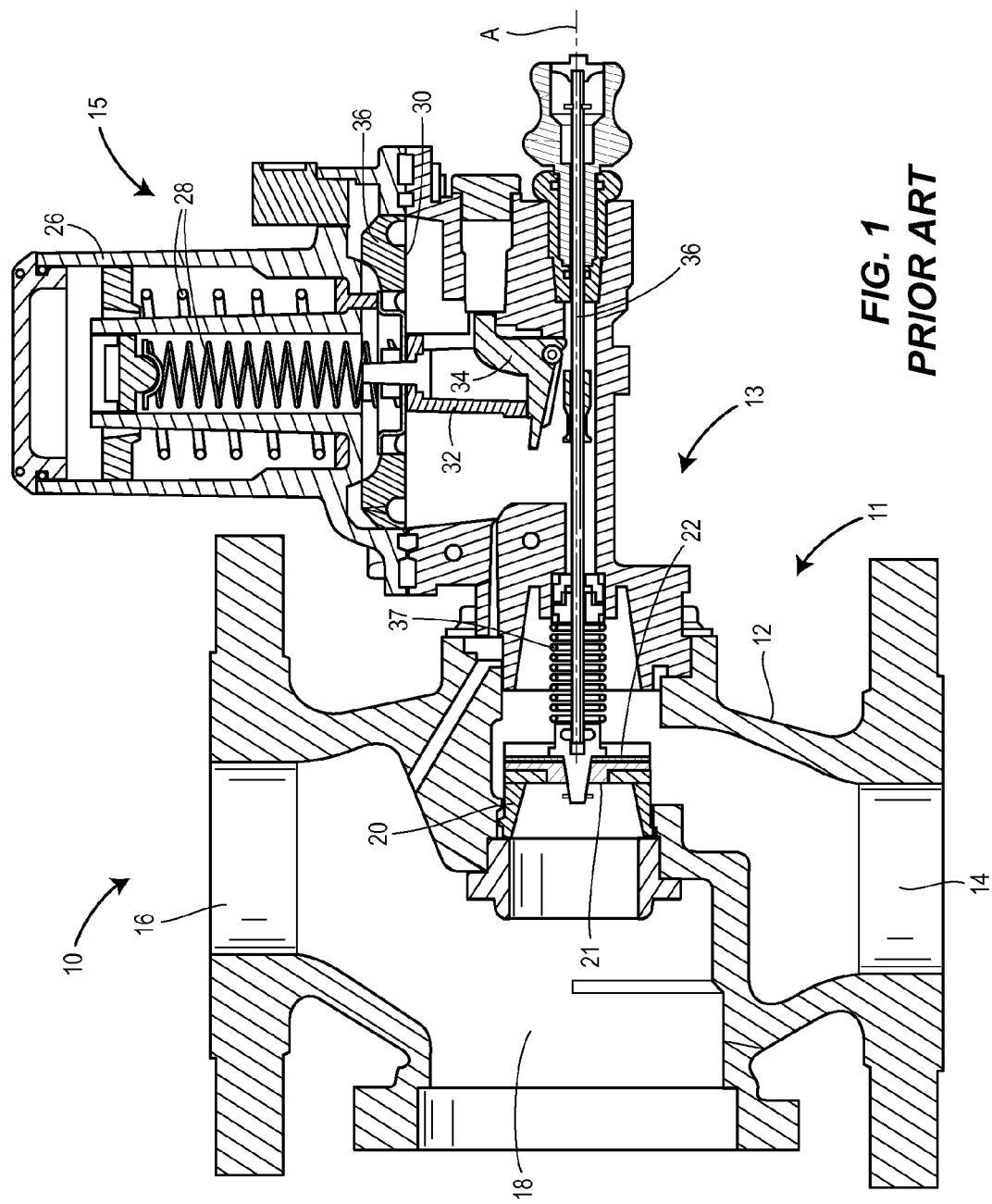
FIG. 1 is a cross-sectional view of a prior art slam shut safety valve with a valve disc in a closed position.

FIG. 1 illustrates one example of a known slam shut safety device 10. The slam shut safety device 10 may be attached to a main regulator (not shown) in a gas distribution system to provide a safety shutoff capability in the event of main regulator failure. The slam shut safety device 10 includes a valve portion 11, a slam shut portion 13, and an actuator 15. The valve portion 11 includes a valve body 12 having a fluid inlet 14, and a fluid outlet 16 connected by a fluid passage forming a flow path 18. A slam shut valve seat 20 is disposed within the valve body 12 and defines a flow orifice 21 forming a portion of the flow path 18. The slam shut valve seat 20 may be secured in position by a valve seat cap 23, which is located adjacent the slam shut valve seat 20. The valve seat cap 23 may be secured in the flow path 18 by being operatively secured to the valve body 12. The slam shut valve seat 20 may be located between the valve seat cap 23 and the valve disc 22. Consequently, fluid flowing through the slam-shut safety device 10 flows from the fluid inlet 14, through the flow path 18 including the valve seat cap 23 and the slam shut valve seat 20 to the fluid outlet 16.

The slam shut portion 13 includes the valve disc 22, which cooperates with the slam shut valve seat 20 to restrict fluid flow through the valve body 12 when an overpressure or underpressure condition is sensed downstream of the main regulator. The valve disc 22 slides within the valve body 12 toward the slam shut valve seat 20 in order to close the fluid orifice 21, and away from the slam shut valve seat 20 in order to open the flow orifice 21.

Typically, the actuator 15 includes a housing 26 enclosing one or more springs 28, and the springs 28 may be connected to a diaphragm 30. The diaphragm 30 may be sensitive to pressure changes and may move within the actuator housing 26 in response to these pressure changes. The diaphragm 30 may be connected to a plunger 32, which moves longitudinally within the housing 26 in conjunction with the diaphragm 30. The plunger 32 is operatively connected to a cam 34, which engages or releases a reset pin 36. The reset pin 36 may be shiftable along a slam-shut axis A relative to the valve body 12 between a retracted or untripped position in which the valve disc 22 is spaced away from the slam shut valve seat 20 in an open position opening the flow orifice 21, and an extended or tripped position in which the valve disc 22 is seated against the slam shut valve seat 20 in a closed position closing the flow orifice 21.

The slam-shut portion may include a spring 37, or other suitable biasing mechanism, which biases the valve disc 22 toward the closed position. Consequently, the reset pin 36 is shiftable between the untripped position and the tripped position when the actuator 15 senses either an overpressure condition or an underpressure condition. The actuator 15 causes the cam 34 to release the reset pin 36, and the spring 37 forces the reset pin 36 and the valve disc 22 to slide toward the slam shut valve seat 20, ultimately bringing the valve disc 22 into contact with the slam shut valve seat 20, thus closing the flow orifice 21 and shutting off fluid flow through the flow path 18 in the valve body 12.

The reset pin 36, when positioned in the untripped position, may be held in place by the cam 34 or other suitable latching mechanism, the cam 34 releasably holding the reset pin 36 in the untripped position (which can also be referred to as the armed position) with the valve disc 22 spaced away from the slam shut valve seat 20. When the cam 34 is activated by the actuator 15, the cam 34 releases the reset pin 36, and the valve disc 22 slides or otherwise shifts toward the valve seat 20 to close the slam-shut safety device 10, preventing fluid flow through the flow path 18 of the valve body 12.

Figure 2:
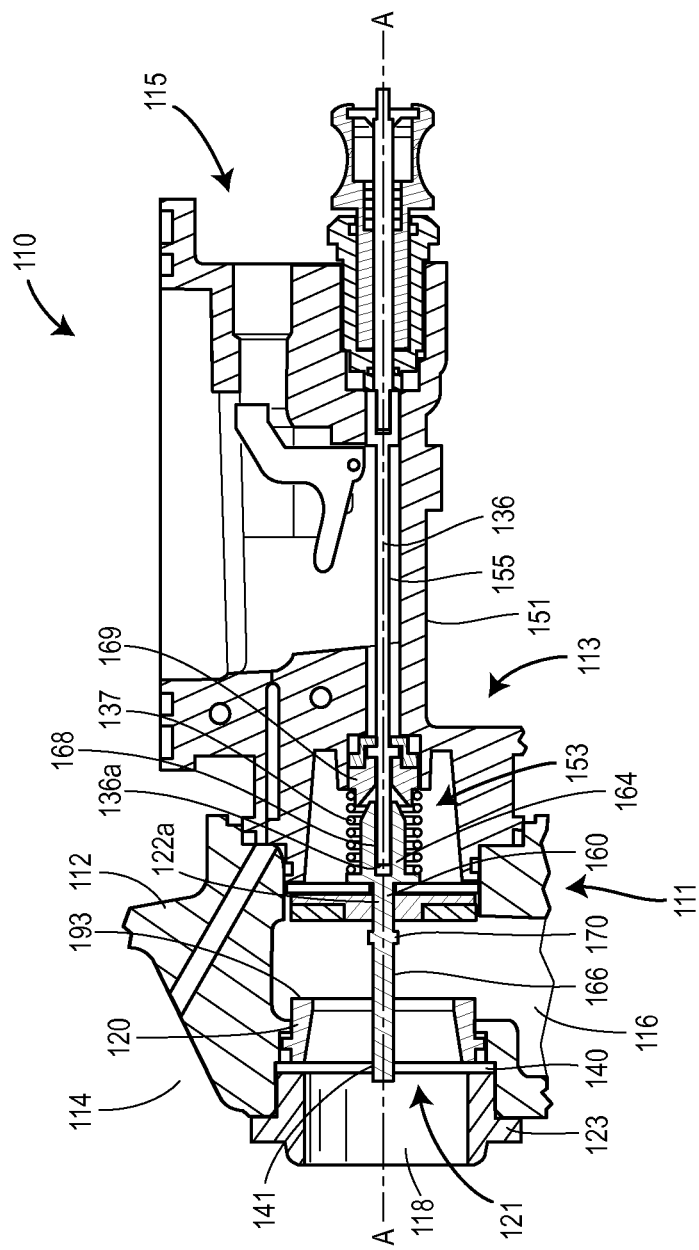
FIG. 2 is a cross-sectional side view of a slam shut safety valve constructed in accordance with the teachings of the present disclosure, incorporating a reset pin guide with the valve disc in an open position.
Figure 3:
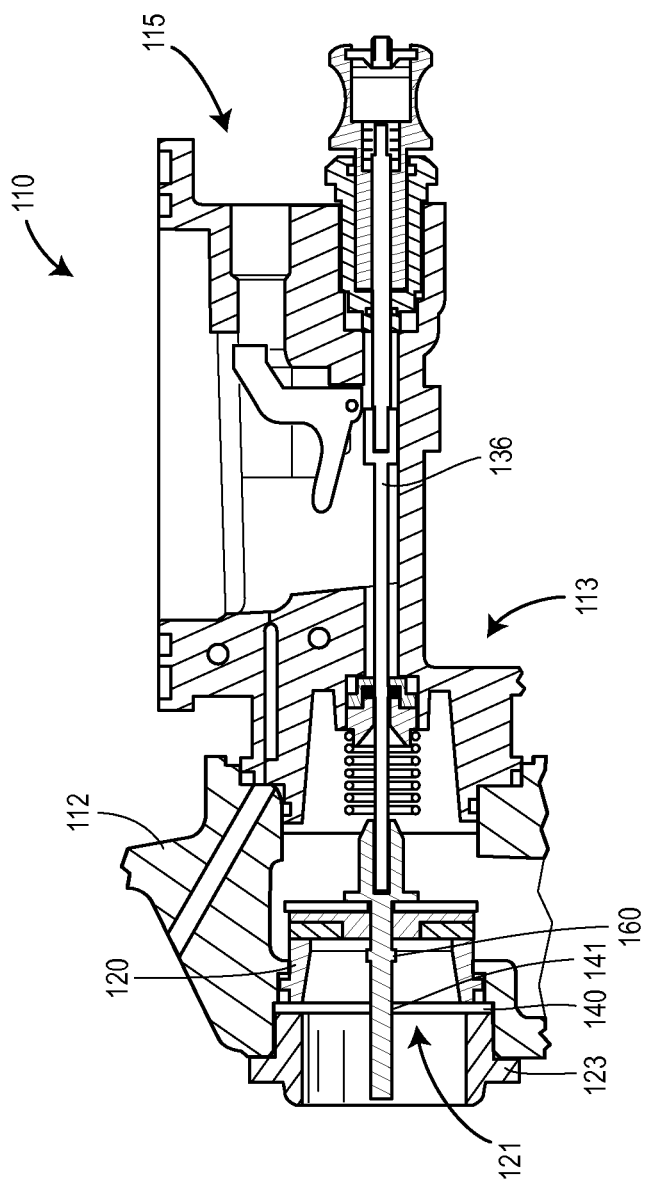
FIG. 3 is a cross-sectional side view of a slam shut safety valve constructed in accordance with the teachings of the present disclosure, incorporating a reset pin guide with the valve disc in a closed position.

Referring now to FIGS. 2 and 3, a slam shut safety device 110 assembled in accordance with the teachings of the present disclosure is illustrated. The slam shut safety device 110 may be similar to the slam shut safety device 10 discussed above with respect to FIG. 1, and therefore, the same or similar components will have the same reference numerals, although the reference numerals will be increased by 100. Once again, the slam shut safety device 110 may be attached to a main regulator (not shown) in a gas distribution system to provide a safety shutoff capability in the event of main regulator failure. As illustrated in FIG. 2, the slam shut safety device 110 may include a slam shut portion 113 and an actuator 115 (only partially illustrated in FIGS. 2 and 3), adapted to be connected to a valve portion 111. The valve portion 111 includes a valve body 112 having a fluid inlet 114 and a fluid outlet 116, with the inlet 114 and the outlet 116 being connected by a fluid passage forming a flow path 118. A slam shut valve seat 120 is disposed within the valve body 112 and defines a flow orifice 121 forming a portion of the flow path 118. A valve seat cap 123 is operatively secured to the valve body 112 to retain the slam shut valve seat 120 within the flow path 118. Consequently, fluid flowing through the valve portion 111 flows from the fluid inlet 114, through the flow path 118 including the valve seat cap 123 and the slam shut valve seat 120 to the fluid outlet 116.

In the embodiment illustrated in FIGS. 2 and 3, the slam-shut safety device 110 includes a reset pin guide 140 located between the valve seat cap 123 and the slam shut valve seat 120. The reset pin guide 140 includes a central opening 141 that is sized and shaped to receive a portion of a plug support 160. The plug support 160 forms part of the reset pin 136. In some embodiments, the plug support 160 and the reset pin 136 may be integrally formed. In other embodiments, the plug support 160 may be a separate element that is operatively secured to the reset pin 136. The reset pin guide 140 supports the plug support 160, and thus the reset pin 136, throughout the range of motion of the reset pin 136 from the open position (FIG. 2) to the closed position (FIG. 3).

The slam shut portion 113 in FIGS. 2 and 3 includes a slam shut body 151 and the reset pin 136, which is slidably disposed in a reset bore 155 of the slam shut body 151. The reset pin 136 and reset bore 155 are disposed on a common slam shut axis A. The slam shut body 151 further defines a throat portion 153 disposed between the reset bore 155 and the slam shut valve seat 120. The valve disc 122 cooperates with the slam shut valve seat 120 to restrict fluid flow through the slam shut safety device 110 when an overpressure or underpressure condition is sensed downstream of the main regulator. The valve disc 122 is operably connected to a first end 136a of the reset pin 136 such that the valve disc 122 shifts along the slam-shut axis A toward the valve seat 120 in order to close the slam shut valve seat 120 in reaction to actuation of the actuator 115, and further shifts along the slam-shut axis A away from the slam shut valve seat 120 in order to open the slam shut valve seat 120 in reaction to manipulation of the reset pin 136.

The plug support 160 operably connects the valve disc 122 to the first end 136a of the reset pin 136. The plug support 160 includes a body portion 164 and a nose portion 166 extending away from the body portion 164. The body portion 164 includes a generally cylindrical form defining a blind bore 168 receiving and connecting to the first end 136a of the reset pin 136. A clip may also be included to connect the plug support 160 to the reset pin 136. The nose portion 166 also includes a generally cylindrical form, but with a diameter substantially smaller than a diameter of the body portion 164. The nose portion 166 extends through a central opening 122a of the valve disc 122, and also through the central opening 141 in the reset pin guide 140. A locking clip 170 may be fixed to the nose portion 166 for retaining the valve disc 122 on the plug support 160 in a manner that allows the valve disc 122 to float axially a limited distance along the nose portion 166 for facilitating alignment of the valve disc 122 relative to the slam shut valve seat 120.

The reset pin 136 is shiftable along the slam shut axis A relative to the valve body 112 between a retracted or untripped position in which the valve disc 122 is spaced away from the slam shut valve seat 120 in an open position (FIG. 2) opening the slam shut valve seat 120, and an extended or tripped position in which the valve disc 122 is seated against the slam shut valve seat 120 in a closed position (FIG. 3) closing the slam shut valve seat 120. The slam shut portion 113 additionally includes a spring 137 or other suitable biasing mechanism near the end 136a of the reset pin 136 between the plug support 160 and a spring seat 169 mounted to the slam-shut body 151 and adjacent to the valve disc 122. The spring 137 acts to bias the valve disc 122 toward the closed position.

The spring 137 biases the reset pin 136, the plug support 160, and the valve disc 122 toward the slam shut valve seat 120 and into the closed position. When occupying the closed position, the valve disc 122 sealingly engages an end 193 of the slam shut valve seat 122 to provide a fluid-tight seal.

Throughout the operation of the device, when the valve disc 122 is in the open position, or another position displaced away from the closed position, fluid flows through the valve body 112 and fluid forces act on the valve disc 122. These fluid forces can be high enough to deform the structure supporting the valve disc 122 such as the reset pin 136 or plug support 160, for example.

Figure 4:
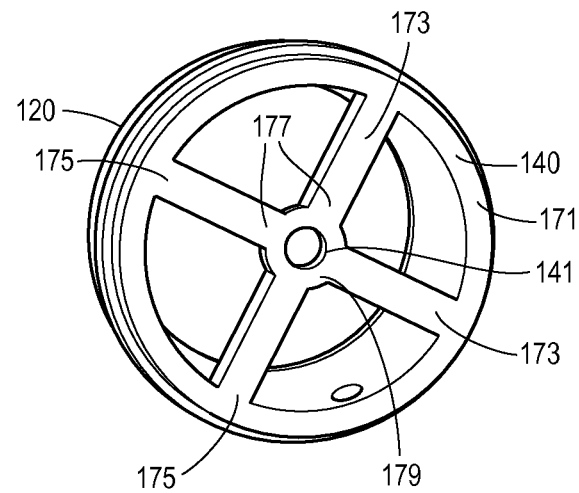
FIG. 4 is a side perspective view of one embodiment of a reset pin guide that is integral with a slam shut valve seat.
Figure 5:
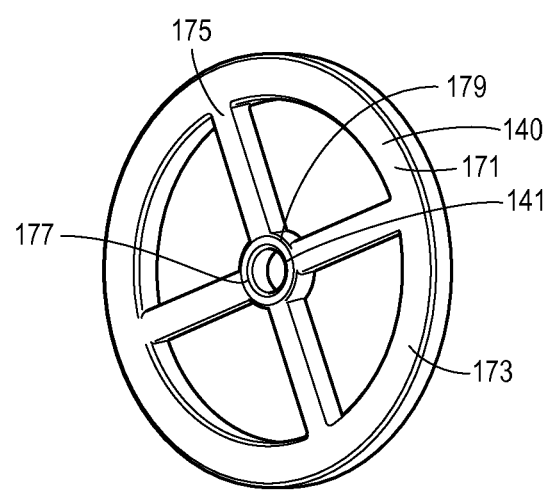
FIG. 5 is a side perspective view of another embodiment of a reset pin guide that is separate from a slam shut valve seat.

In contrast to the conventional slam shut safety device 10, however, the disclosed of the slam shut safety device 110 includes the reset pin guide 140. As illustrated in FIGS. 4 and 5, the reset pin guide 140 is operatively connected to the slam shut valve seat 120 and includes the central opening 141 extending at least partly over the plug support 160 (or over a portion of the reset pin 136). In the embodiment of FIG. 4, the reset pin guide 140 is integrally formed with the slam shut valve seat 120. In the embodiment of FIG. 5, the reset pin guide 140 is a separate element that may be disposed adjacent to the slam shut valve seat 120. In other versions, the reset pin guide 140 may be connected to the valve body 112 by a threaded connection, a weld joint, a friction fit joint, a pinned joint, an adhesive joint, a fastener connection, or any other suitable means. In yet other embodiments, the reset pin guide 140 may be clamped between the slam shut valve seat 120 and the valve seat cap 123.

With continued reference to FIGS. 4 and 5, the reset pin guide 140 may include an outer annular ring 171 and a plurality of spokes 173 extending radially inwardly from the outer annular ring 171. The embodiments of FIGS. 4 and 5 include four spokes 173. Other embodiments may include more or less than four spokes. For example, other embodiments may include 2, 3, 5, 6, 7, 8, or more spokes. The plurality of spokes 173 have first ends 175 that are connected to the outer annular ring 171, and second ends 177 that are connected to an inner annular ring 179. The inner annular ring 179 forms the central opening 141, through which a portion of the plug support 160 extends. The inner annular ring 179 radially supports the plug support 160 as the plug support 160, and the reset pin 136 are moved by the actuator 115 between the open position and the closed position.

The reset pin 136 is therefore supported at two ends, which improves seating alignment of the valve disc 122 with the slam shut valve seat 120. More specifically, the reset pin 136 is supported at a first end by the reset pin guide 140 and at a second end by the reset bore 155.

As illustrated above, the reset pin guide 140 may be integrally formed with the slam shut valve seat 120 in some embodiments to reduce manufacturing and assembly costs. In other embodiments, the reset pin guide 140 may be shaped to produce certain flow characteristics, which may improve regulator performance. In some embodiments, the reset pin guide may improve the performance of the regulator by reducing the boost effect.

In some embodiments, the valve seat cap 123, the slam shut valve seat 120, the reset pin 136, the valve disc 122, and the reset pin guide 136 may form a reset pin guide assembly.

The disclosed slam-shut safety device advantageously reduces deflection of the reset pin under all conditions, but especially under high flow conditions (e.g., up to 6000 m$^3$/h). The disclosed slam shut safety device may also advantageously eliminate or reduce the need for an upstream device to deflect flow away from the valve disc and reset pin.

The disclosed slam shut safety device advantageously minimizes the effects of fluid transfer on the operation and movement of the valve disc and maintains the structural integrity of the reset pin by supporting the reset pin at two ends. This construct therefore maintains the intended functionality and maximizes the useful life of the slam shut safety device. Therefore, it can be understood that any version of the reset pin guide described herein can be referred to as a means coupled to the slam shut valve seat for protecting the reset pin against detrimental effects of fluid forces generated in the valve body adjacent to the valve disc.

Each of the optional arrangements described herein may be arranged in any set of combinations or permutations sufficient to provide any combination of one or more functionalities suggested by the description provided herein. Further, it is understood that each of the features disclosed with respect to each exemplary arrangement may be combined in any functional combination, such as to provide any useful combination of functionalities as would be understood by a person of ordinary skill.

While certain representative arrangements of slam shut devices and details have been described herein for purposes of illustrating the invention, it will be apparent to those skilled in the art that various changes in the devices disclosed may be made without departing from the spirit and scope of the invention, which is defined by the following claims and is not limited in any manner by the foregoing description.

What is claimed:

1. A reset pin guide assembly for a slam shut safety device, the assembly comprising:
   a slam shut valve seat;
   a reset pin;
   a valve disc operatively connected to the reset pin, the reset pin and the valve disc being movable between a first position in which the valve disc is spaced apart from the slam shut valve seat and a second position in which the valve disc is adjacent the slam shut valve seat;

a valve seat cap that is configured to secure the slam shut valve seat in a valve body, the valve seat cap being located upstream of the slam shut valve seat; and a reset pin guide disposed between the slam shut valve seat and the valve seat cap, the reset pin guide supporting one end of the reset pin.

2. The reset pin guide assembly of claim 1, wherein the reset pin guide is integral with the slam shut valve seat.

3. The reset pin guide assembly of claim 1, wherein the reset pin guide includes a central opening that is sized and shaped to receive a portion of the reset pin.

4. The reset pin guide assembly of claim 3, wherein the reset pin guide includes an outer annular ring.

5. The reset pin guide assembly of claim 4, wherein the reset pin guide includes an inner annular ring, the inner annular ring forming the central opening.

6. The reset pin guide assembly of claim 5, wherein the reset pin guide includes a plurality of spokes connecting the outer annular ring to the inner annular ring.

7. The reset pin guide assembly of claim 6, wherein the plurality of spokes comprises four spokes.

8. The reset pin guide assembly of claim 1, wherein the reset pin guide is formed to characterize fluid flow therethrough.

9. A slam shut safety device, comprising:

a valve body having an inlet, an outlet, and defining a flow path extending between the inlet and the outlet, the valve body including a slam shut valve seat surrounding an orifice disposed between the inlet and the outlet and a valve seat cap configured to secure the slam shut valve seat in the valve body, the valve seat cap being located upstream of the slam shut valve seat;

a valve disc disposed within the valve body and shiftable along a slam-shut axis between an open first position in which the valve disc is spaced away from the slam shut valve seat, and a closed second position in which the valve disc is seated against the slam shut valve seat;

a reset pin operatively coupled to the valve disc and shiftable along the slam-shut axis relative to the valve body between an untripped position placing the valve disc in the open first position and a tripped position placing the valve disc in the closed second position, the reset pin arranged to respond to an actuator to shift the reset pin from the untripped position toward the tripped position; and a reset pin guide proximate the slam shut valve seat, the reset pin guide including a central opening sized and shaped to receive a portion of the reset pin, the reset pin guide being located between the valve seat cap and the slam shut valve seat.

10. The slam shut safety device of claim 9, wherein the reset pin guide is integral with the slam shut valve seat.

11. The slam shut safety device of claim 9, wherein the reset pin guide includes an outer annular ring.

12. The slam shut safety device of claim 11, wherein the reset pin guide includes an inner annular ring, the inner annular ring forming the central opening.

13. The slam shut safety device of claim 12, wherein the reset pin guide includes a plurality of spokes connecting the outer annular ring to the inner annular ring.

14. The slam shut safety device of claim 13, wherein the plurality of spokes comprises four spokes.

15. The slam shut safety device of claim 9, wherein the reset pin guide is formed to characterize fluid flow therethrough.

16. The slam shut safety device of claim 9, wherein the reset pin guide is clamped between the slam shut valve seat and the valve seat cap.

* * * * *